(12) United States Patent
Li et al.

(10) Patent No.: US 10,248,829 B2
(45) Date of Patent: Apr. 2, 2019

(54) FINGERPRINT DETECTION CIRCUIT AND METHOD, ELECTRONIC DEVICE

(71) Applicant: BYD COMPANY LIMITED, Shenzhen (CN)

(72) Inventors: Zhengang Li, Shenzhen (CN); Kunping Xu, Shenzhen (CN); Yun Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/549,896

(22) PCT Filed: Jan. 5, 2016

(86) PCT No.: PCT/CN2016/070196
§ 371 (c)(1),
(2) Date: Aug. 9, 2017

(87) PCT Pub. No.: WO2016/127738
PCT Pub. Date: Aug. 18, 2016

(65) Prior Publication Data
US 2018/0025198 A1    Jan. 25, 2018

(30) Foreign Application Priority Data
Feb. 13, 2015  (CN) .......................... 2015 1 0082140

(51) Int. Cl.
*G06K 9/00* (2006.01)
(52) U.S. Cl.
CPC .................... *G06K 9/0002* (2013.01)
(58) Field of Classification Search
None
See application file for complete search history.

(56) References Cited

U.S. PATENT DOCUMENTS

| 7,146,024 B2* | 12/2006 | Benkley, III | ......... G06K 9/0002 |
| | | | 382/107 |
| 8,888,004 B2* | 11/2014 | Setlak | .................... G06K 9/605 |
| | | | 235/439 |

(Continued)

FOREIGN PATENT DOCUMENTS

| CN | 101526988 A | 9/2009 |
| CN | 103902971 A | 7/2014 |
| CN | 104217193 A | 12/2014 |

OTHER PUBLICATIONS

The World Intellectual Property Organization (WIPO) International Search Report and Written Opinion for PCT/CN2016/070196 dated Mar. 31, 2016 8 Pages.

*Primary Examiner* — K. Wong
(74) *Attorney, Agent, or Firm* — Anova Law Group, PLLC

(57) ABSTRACT

The present disclosure provides a fingerprint detection circuit and method. The circuit includes a fingerprint collecting module and a processing module. The fingerprint collecting module includes a plurality of collecting units, and each collecting unit has a regulation voltage and is configured to output a first voltage or a second voltage according to a capacitance value of one of ridge capacitors, a capacitance value of one of ridge capacitors and the regulation voltage. The processing module is configured to amplify the first and second voltages by a predetermined factor, to calculate a difference between the amplified first and second voltages, and to determine whether the difference is greater than or equal to the predetermined threshold. If no, the processing module adjusts at least one parameter, and configures the fingerprint detection circuit using at least one adjusted parameter.

19 Claims, 6 Drawing Sheets

(56) References Cited

U.S. PATENT DOCUMENTS

| | | | | |
|---|---|---|---|---|
| 9,679,186 B2 * | 6/2017 | Zhang | ............... | G06K 9/0002 |
| 9,818,018 B2 * | 11/2017 | Lin | ................ | G06K 9/00053 |
| 9,823,794 B2 * | 11/2017 | Cho | .................... | G06F 3/044 |
| 2005/0094855 A1 | 5/2005 | Proano et al. | | |
| 2009/0123039 A1 | 5/2009 | Gozzini | | |
| 2011/0084711 A1 | 4/2011 | Chang et al. | | |

* cited by examiner

FINGERPRINT DETECTION CIRCUIT AND METHOD, ELECTRONIC DEVICE

CROSS REFERENCE TO RELATED APPLICATIONS

This application is a national phase under 35 U.S.C. § 371 of International Application No. PCT/CN2016/070196, filed on Jan. 5, 2016, which claims priority and benefits of Chinese Patent Application No. 201510082140.2, filed with State Intellectual Property Office, P. R. C. on Feb. 13, 2015, the entire content of which is incorporated herein by reference.

FIELD

The present disclosure relates to a fingerprint detection technology field and, more particularly to a fingerprint detection circuit, a fingerprint detection method and an electronic device.

BACKGROUND

In the related art, since a capacitive fingerprint detection circuit in a chip has advantages of small size and low power consumption, this kind of fingerprint detection circuit is more preferred in a market of mobile phones and tablets.

The above capacitive fingerprint detection circuit detects fingerprint ridge information and fingerprint valley information. Since the distance between the fingerprint ridge and a sensing unit of the fingerprint detection unit is relatively close, and the distance between the fingerprint valley and the sensing unit of the fingerprint detection unit is relatively far, there is a difference between a ridge capacitance generated between the fingerprint ridge and the sensing unit and a valley capacitance generated between the fingerprint valley and the sensing unit. Once the ridge capacitance and the valley capacitance (referred to finger capacitance hereinafter) are detected, ridge characteristic and valley characteristic may be analyzed.

A voltage output from the above fingerprint detection circuit has a proportional linear relation with the finger capacitance (capacitance to be tested). A final result has a small difference between an output voltage corresponding to the finger capacitance of the ridge and an output voltage corresponding to the finger capacitance of the valley, so that it needs to amplify an output voltage corresponding to the finger capacitance by a predetermined factor for processing, in which the predetermined factor is generally a fixed value set based on experience. However, each person's finger is different, and thus the fixed predetermined factor will affect the accuracy of the final result.

SUMMARY

Embodiments of the present disclosure seek to solve at least one of the problems existing in the related art to at least sonic extent.

For this, the present disclosure provides a fingerprint detection circuit, a fingerprint detection method and an electronic device.

According to embodiments of a first aspect of the present disclosure, a fingerprint detection circuit is provided. The fingerprint detection circuit is configured to apply an excitation signal to a finger so as to generate ridge capacitors and valley capacitors, and includes: a fingerprint collecting module comprising a plurality of collecting units, in which each of the plurality of collecting unit has a regulation voltage, and is configured to output a first voltage according to a capacitance value of one of the ridge capacitors, a capacitance value of one of the valley capacitors and the regulation voltage; and a processing module connected with the fingerprint collecting module and configured to amplify the first voltage and the second voltage by a predetermined factor, to calculate a difference between an amplified first voltage and an amplified second voltage, and to determine whether the difference is greater than or equal to a predetermined threshold. If the difference is greater than or equal to the predetermined threshold, the processing module is further configured to calculate the capacitance value of one of the ridge capacitors according to the first voltage, and to calculate the capacitance value of one of the valley capacitors according to the second voltage. If the difference is less than the predetermined threshold, the processing module is further configured to adjust at least one of an excitation voltage, the predetermined factor and the regulation voltage according to the predetermined threshold and the difference, and to configure the fingerprint collecting module and the processing module using at least one adjusted parameter, in which the excitation voltage is a voltage magnitude of the excitation signal.

With the fingerprint detection circuit according to embodiments of the present disclosure, if the difference between the amplified first voltage and the amplified second voltage is less than the predetermined threshold, the processing module adjusts the difference by adjusting at least one of the excitation voltage, the predetermined factor and the regulation voltage, such that the difference between the amplified first voltage and the amplified second voltage is enlarged, and the signal-to-noise ratio is increased, which is more easy for subsequent algorithms to recognize, thus improving the effect of fingerprint detection.

According to embodiments of a second aspect of the present disclosure, a fingerprint detection method is provided. The fingerprint defection method includes: applying an excitation signal to a finger so as to generate ridge capacitors and valley capacitors; generating a first voltage or a second voltage by a collecting unit according to a regulation voltage, a capacitance value of one of the ridge capacitors and a capacitance value of one of the valley capacitors; amplifying the first voltage and the second voltage with a predetermined factor by a processing module; calculating a difference between an amplified first voltage and an amplified second voltage by the processing module; determining whether the difference is greater than or equal to a predetermined threshold by the processing module; if the difference is greater than or equal to a predetermined threshold, calculating the capacitance value of one of the ridge capacitors according to the first voltage and calculating the capacitance value of one of the valley capacitors according to the second voltage by the processing module; and if the difference is less than the predetermined threshold, adjusting at least one of an excitation voltage, the predetermined factor and the regulation voltage according to the predetermined threshold and the difference by the processing module, and configuring; the collecting unit and the processing module using at least one adjusted parameter, in which the excitation voltage is a voltage magnitude of the excitation signal.

With the fingerprint detection method according to embodiments of the present disclosure, if the difference between the amplified first voltage and the amplified second voltage is less than the predetermined threshold, the processing module adjusts the difference by adjusting at least one of the excitation voltage, the predetermined factor and the regulation voltage, such that the difference between the amplified first voltage and the amplified second voltage is enlarged, and the signal-to-noise ratio is increased, which is more easy for subsequent algorithms to recognize, thus improving the effect of fingerprint detection.

According to embodiments of a third aspect of the present disclosure, an electronic device is provided, and the electronic device includes the fingerprint detection circuit according to embodiments of the first aspect of the present disclosure.

With the electronic device according to embodiments of the present disclosure, if the difference between the amplified first voltage and the amplified second voltage is less than the predetermined threshold, the processing module adjusts the difference by adjusting at least one of the excitation voltage, the predetermined factor and the regulation voltage, such that the difference between the amplified first voltage and the amplified second voltage is enlarged, and the signal-to-noise ratio is increased, which is more easy for subsequent algorithms to recognize thus improving the effect of fingerprint detection.

The attached aspects and advantages of the present disclosure will be presented in following descriptions, and parts of which will become obviously in following descriptions, or learn by practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
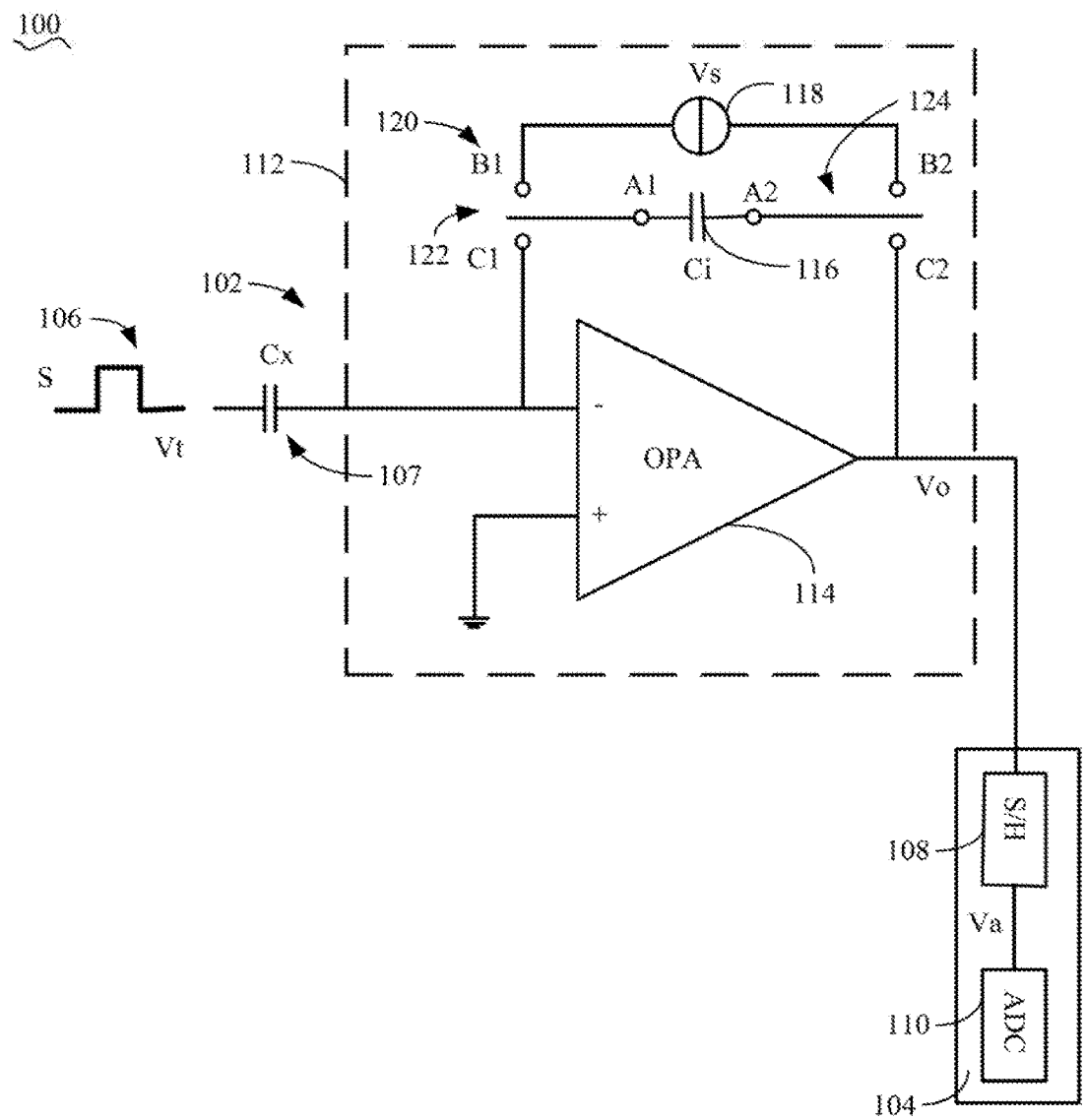
FIG. 1 is a schematic diagram of a fingerprint detection circuit according to an exemplary embodiment of the present disclosure.

Exemplary embodiments will be described in detail herein, and examples thereof are illustrated in accompanying drawings. Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can he inner mountings, connections and couplings of two components, and further can be direct and indirect mountings, connections, and couplings, which, can be understood by those skilled in the art according to the detail embodiment of the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

In the following, a fingerprint detection circuit, a fingerprint detection method and an electronic device are described in detail with reference to drawings.

FIG. 1 is a schematic diagram of a fingerprint detection circuit according to an exemplary embodiment of the present disclosure. As shown in FIG. 1, the fingerprint detection circuit 100 includes a fingerprint collecting module 102 and a processing module 104.

When collecting fingerprints (see FIG. 2), the fingerprint detection circuit 100 may apply an excitation signal to a finger 500 so as to generate ridge capacitors and valley capacitors. For example, the fingerprint detection circuit 100 may output the excitation signal via a signal generator 106, and transmit the excitation signal to the finger 500 via an emission electrode (not shown). The excitation signal may be an alternating signal, such as a sine-wave signal, a square wave signal, or a triangular wave signal. The voltage magnitude of the alternating signal (referred to excitation voltage hereinafter) is Vt, and the frequency of the alternating signal is S.

The ridge capacitors are generated between a fingerprint ridge of the finger 500 and a fingerprint sensor 502, and the valley capacitors are generated between a fingerprint valley of the finger 500 and the fingerprint sensor 502. Each of the ridge capacitors and the valley capacitors can be referred to as a finger capacitor 107.

Figure 2:
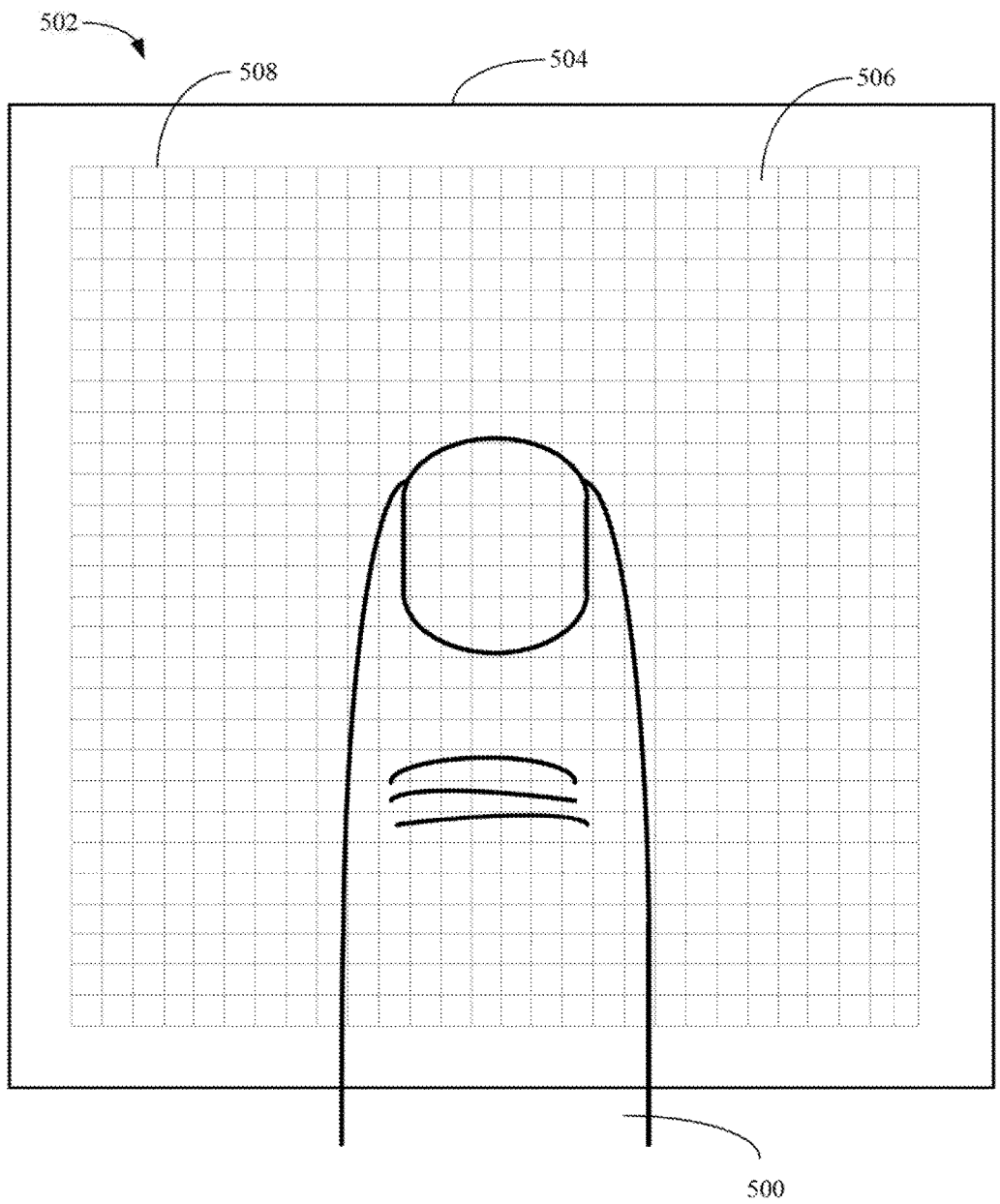
FIG. 2 is a schematic diagram illustrating a fingerprint collecting operation performed by the fingerprint detection circuit according to an exemplary embodiment of the present disclosure.

For example, as shown in FIG. 2, the fingerprint sensor 502 includes a frame 504 and a two-dimensional detecting array 508 consisting of a plurality of fingerprint sensing units 506.

The frame 504 is arranged around the two-dimensional detecting array 508, and provides the excitation signal (such as the alternating signal) when fingerprint detecting is performed. For example, the frame 504 may be connected with the emission electrode for outputting the excitation signal.

Each fingerprint sensing unit 506 is configured to collect a single pixel of a fingerprint image. For example, each fingerprint sensing unit 506 usually has a size of about 50 um*50 um. A capacitance value of the finger capacitor 107 generated between the fingerprint sensing unit 506 and the finger 500 represents a ridge characteristic or a valley characteristic of the fingerprint. Therefore, by detecting the capacitance values of a plurality of finger capacitors, each of which is generated between one fingerprint sensing unit 506 aid the finger 500, the ridge and valley characteristics of the fingerprint image can be analyzed according to the plurality of finger capacitors 107.

The fingerprint collecting module 102 includes a plurality of collecting units 112. Each collecting unit 112 has a regulation voltage, and is configured to output a first voltage or a second voltage according to a capacitance value of one of the ridge capacitors, a capacitance value of one of the ridge capacitors, and the regulation voltage.

The processing module 104 is connected with the fingerprint collecting module 102, and configured to amplify the first voltage and the second voltage by a predetermined factor, to calculate a difference between an amplified first voltage and an amplified second voltage, and to determine whether the difference is greater than or equal to a predetermined threshold. The processing module 104 may acquire a correspondence between capacitance value and voltage according to numerical results of these voltages, for example, a small voltage corresponds to the capacitance value of the valley capacitor, and a big voltage corresponds to the capacitance value of the ridge capacitor, thus obtaining the first voltage and the second voltage.

If the difference is greater than or equal to the predetermined threshold, the processing module 104 is further configured to calculate the capacitance value of one of the ridge capacitors according to the first voltage, and to calculate the capacitance value of one of the valley capacitors according to the second voltage. Using fingerprint data satisfying the condition, the fingerprint detection circuit 100 calculates the capacitance value of the finger capacitor 107 and performs following applications.

If the difference is less than the predetermined threshold, the processing module 104 is further configured to adjust at least one of the excitation voltage of the fingerprint detection circuit 100, the predetermined factor and the regulation voltage according to the predetermined threshold and the difference, and to configure the fingerprint collecting module 102 and the processing module 104 using at least one adjusted parameter, in which the excitation voltage is a voltage magnitude of the excitation signal.

If the predetermined factor is adjusted, the processing module 104 is further configured to amplify the first voltage acid the second voltage by an adjusted predetermined factor, to calculate an adjusted difference between an adjusted value of the amplified first voltage and an adjusted value of the amplified second voltage, and to determine whether the adjusted difference is greater than or equal to the predetermined threshold.

If at least one of the excitation voltage and the regulation voltage is adjusted, or if each of the excitation voltage, the regulation voltage and the predetermined factor is adjusted, the collecting unit 112 is further configured to output a first adjusted voltage or a second adjusted voltage according to the capacitance value of one of the valley capacitors, the capacitance value of one of the ridge capacitors, and the adjusted regulation voltage, and the processing module 104 is further configured to amplify the first adjusted voltage and the second adjusted voltage by the predetermined factor or by the adjusted predetermined factor, to calculate the adjusted difference between the amplified value of the first adjusted voltage and the amplified value of the second adjusted voltage, and to determine whether the adjusted difference is greater than or equal to the predetermined threshold.

In an embodiment, each collecting unit 11.2 is corresponding to one fingerprint sensing unit 506. For sake of clarity, FIG. 1 shows only one collecting unit 112. As shown in FIG. 1, each collecting unit 112 may include a signal amplifier 114, a capacitor 116, and a switch unit 120.

In an embodiment, a negative input terminal of the signal amplifier 114 is connected with one of the ridge capacitors or one of the valley capacitors. In other words, in the fingerprint detection circuit 100, the negative input terminal of the signal amplifier 114 is connected with the finger capacitor 107. A positive input terminal of the signal amplifier 114 is connected with a voltage reference terminal. The signal amplifier 114 is configured to output the output voltage (for example, the first voltage or the second voltage) from the output terminal of the signal amplifier 114 according to the capacitance value of the finger capacitor 107 and the regulation voltage.

In an embodiment, the voltage reference terminal is a ground terminal. That is, the positive input terminal of the signal amplifier 114 is connected with the ground terminal.

In an embodiment, the capacitor 116 may be an inner capacitor of the fingerprint sensor or other capacitors, and the capacitance value of the capacitor 116 is usually fixed. In this embodiment, the voltage between two terminals of the capacitor 116 is the regulation voltage.

The switch unit 120 is connected with the negative input terminal of the signal amplifier 114 and the output terminal of the signal amplifier 114 respectively, and is configured to control the capacitor 116 to be connected between the negative input terminal of the signal amplifier 114 and the output terminal of the signal amplifier 114, such that the first voltage has a non-linear relationship with the capacitance value of one of the ridge capacitors, and the second voltage has a non-linear relationship with the capacitance value of one of the valley capacitors.

In an embodiment, the collecting unit 112 may further include a first power supply 118. The first power supply 118 is connected with the capacitor 116 via the switch unit 120, and the switch unit: 120 is configured to control the first power supply 118 to charge the capacitor 116 or control the capacitor 116 to disconnect from the first power supply 118. The first power supply 118 may be an inner power supply of the fingerprint detection circuit 100. For example, a first electrode of the first power supply 118 is a negative electrode, and a second electrode of the first power supply 118 is a positive electrode.

Furthermore, the switch unit 120 includes a first switch 122 and a second switch 124.

The first switch 122 includes a first selecting terminal A1, a first power terminal B1 and a first connecting terminal Cl, the first selecting terminal A1 is connected with a first terminal of the capacitor 116, the first power terminal B1 is connected with the first electrode of the first power supply 118, and the first connecting terminal C1 is connected with the negative input terminal of the signal amplifier 114.

The second switch 124 includes a second selecting terminal A2, a second power terminal B2 and a second connecting terminal C2, the second selecting terminal A2 is connected with a second terminal of the capacitor 116, the second power terminal B2 is connected with the second electrode of the first power supply 118, and the second connecting terminal C2 is connected with the output terminal of the signal amplifier 114.

The first selecting terminal A1 may be connected with the first connecting terminal C1 or the first power terminal B1, and the second selecting terminal A2 may be connected with the second connecting terminal C2 or the second power terminal B2.

When the first selecting terminal A1 is connected with the first connecting terminal C1 and disconnected from the first power terminal B1, and the second selecting terminal A2 is connected with the second connecting terminal C2 and disconnected from the second power terminal B2, the capacitor 116 is connected between the negative input terminal of the signal amplifier 114 and the output terminal of the signal amplifier 114, and disconnected from the first power supply 118.

When the first selecting terminal A1 is connected with the first power terminal B1 and disconnected from the first connecting terminal C1, and the second selecting terminal A2 is connected. With the second power terminal B2 and disconnected from the second connecting terminal C2, the first power supply charges the capacitor 116, such that there is a certain voltage between two terminals of the capacitor 116, For example, when the fingerprint detection circuit 100 is initialized or needs to adjust the difference, the processing module 104 controls the switch unit 120, such that the first terminal of the capacitor 116 is connected with the first electrode of the first power supply 118 and disconnected from the output terminal of the signal amplifier 114, and the second terminal of the capacitor 116 is connected with the second electrode of the first power supply 118 and disconnected from the output terminal of the signal amplifier 114. Thus, the first power supply 118 charges the capacitor 116 so as to generate the certain voltage (the regulation voltage) between two terminals of the capacitor 116. At this time, the first selecting terminal A1 is connected with the first power terminal B1 and disconnected from the first connecting terminal C1, and the second selecting terminal A2 is connected with the second power terminal B2 and disconnected from the second connecting terminal C2.

When the fingerprint detection circuit 100 collects fingerprints, the processing module 104 controls the switch unit 120, such that the first terminal of the capacitor 116 is connected with the negative input terminal of the signal amplifier 114, and the second terminal of the capacitor 116 is connected with the output terminal of the signal amplifier 114. Thus, the capacitor 116 with the regulation voltage is connected between the negative input terminal of the signal amplifier 114 and the output terminal of the signal amplifier 114. Therefore, the processing module 104 may change the output voltage from the output terminal of the signal amplifier 114 by adjusting the regulation voltage. At this time, the first selecting terminal A1 is connected with the first connecting terminal C1 and disconnected from the first power terminal B1, and the second selecting terminal A2 is connected with the second connecting terminal C2 and disconnected from the second power terminal B2.

In an embodiment, as shown in FIG. 1, the processing module 104 further includes a sampling hold circuit 108 and an AD (analog-to-digital) converter 110. The sampling hold circuit 108 is connected between the output terminal of the signal amplifier 114 and a terminal of the AD converter 110. The sampling hold circuit 108 is configured to amplify the output voltage from the output terminal of the signal amplifier 114 by a predetermined factor. The AD converter 110 is configured to convert an amplified output voltage to a numerical value and save the numerical value. The processing module 104 may further include a digital signal processor (not shown) for processing digital signals, and the digital signal processor is connected with the output terminal of the AD converter 110. The digitized voltages output from the signal amplifier 114 are convenient for following computation.

In an embodiment, the sampling hold circuit 108 may include a plurality of sampling hold units. Each sampling hold unit is corresponding to one collecting unit 112, and the output terminal of each sampling hold unit is connected with the AD converter 110. Thus, the first voltage is an mean value of voltages corresponding to all the valley capacitors, and the second voltage is a mean value of voltages corresponding to all the ridge capacitors.

In an embodiment, the capacitance value of one of the finger capacitors 107 (one of the ridge capacitors or one of the valley capacitors) is determined according to a formula of $V_o=(V_s-V_t*C_x/C_i)$, where, $V_o$ is the first voltage or the second voltage, $V_t$ is the excitation voltage, $C_x$ is the capacitance value of one of the ridge capacitors or the capacitance value of one of the valley capacitors, $C_i$ is the capacitance value of the capacitor 116, and $V_s$ is the regulation voltage. Therefore, the voltage Va input to the AD converter 110 is $V_a=n*(V_s-V_t*C_x/C_i)$, where, a is the predetermined factor for amplifying the first voltage and the second voltage.

According to the above formula, the gain corresponding to the voltage input to the AD converter 110 may be adjusted by three parameters, which are the excitation voltage Vt, the regulation voltage Vs and the predetermined factor n. The three parameters determine together the final voltage (the amplified first voltage or the amplified second voltage) input to the AD converter 110, and finally determine the difference.

For or example, when the fingerprint detection circuit 100 is initialized, the first selecting terminal A1 is connected to the first power terminal B1, the second selecting terminal A2 is connected to the second power terminal 112, the first power terminal B1 is connected to the negative terminal of the first power supply 118, the second power terminal B2 is connected to the positive terminal of the first power supply 118, and the power supply 118 charges the capacitor 116. After charging, the voltage over the capacitor 116 is Vs. In one embodiment, Vc=Vs, Vs is the voltage of the first power supply 118. During initialization, two terminals of the finger capacitor 107 are connected to ground, and the signal generator 114 is connected to ground (i.e. Vt is connected to ground). Then, the first selecting terminal A1 is connected to the first connecting terminal and the second selecting terminal A2 is connected to the second selecting terminal C2, and the capacitor 116 is connected between the negative terminal of the signal amplifier 114 and the output terminal of the signal amplifier 114. At this time, the output voltage from the output terminal of the signal amplifier 114 is equal to Vs, and the initialization is completed.

When the fingerprint detection circuit 100 collects fingerprints, the signal generator 106 increases the excitation voltage Vt, and during the increasing of the excitation voltage Vt, the finger capacitor 107 is charged, in which the electric quantity of charges is $Q=V_t*C_x$. According to the virtual short and virtual off feature of the operational amplifier, the output voltage Vo from the signal amplifier 114 will decrease, and the capacitor 116 is needed to charge with the same amount of charges, thus keeping the input terminal of the operational amplifier at the ground level. Then, the electric quantity charged to the capacitor 116 is (Vs−Vo)

*Ci=Vt*Cx, and thus the output voltage Vo from the output terminal of the signal amplifier 114 is Vo=Vs−Vt*Cx/Ci. Then, the output voltage Vo is amplified n times by the sampling hold circuit 108, and the final detection voltage input to the AD converter 110 is Va=n*(Vs−Vt*Cx/Ci).

For example, when the finger 500 is put on the fingerprint sensor 502, in a traditional detection, the first voltage corresponding to the ridge capacitor Vo1=−2V, and assume that the second voltage corresponding to the valley capacitor is 15% less than the first voltage, the second voltage Vo2=−1.7V. If the input range of the AD converter 110 is 0∼−5V, then the sampling hold circuit 108 may amplify the first voltage and the second voltage by at most 2.5 times, i.e., the amplified first voltage Va1=−5V the amplified second voltage Va2=−4.25V, and the difference Va1−Va2=−0.75V.

In an embodiment, when the fingerprint detection circuit 100 in the present disclosure is used to collect fingerprint and the initialized voltage over the capacitor 116 is assumed to be Vs=1.5V then during detection, the first voltage Vo1=1.5−2=−0.5V, and the second voltage Vo2=1.5−1.7=−0.2V. In this case, the sampling hold circuit 108 ma amplify the first voltage and the second voltage 10 times, the amplified first voltage Va1=−5V, the amplified second voltage Va2=−2V, and the difference Va1−Va2=−3V, which is −3/−0.75=4 times greater than the above difference in the traditional detection. The second voltage is 60% less than the first voltage, which is 4 times greater than 15% in the traditional detection. Then, the difference between the amplified first voltage and the amplified second voltage collected by the processing module 104 is relatively large, and the signal to noise ratio is higher, which is more easily for subsequent algorithms to recognize.

In the above example, if the excitation voltage Vt is 5V, the regulation voltage Vs is 0, the predetermined factor n=1, the first voltage Vo1=−2V, and the second voltage Vo2=−1.7V. Assuming that the input range of the AD converter 100 is 0∼−5V, the limits of which can usually have an allowance of IV, i.e. the input range of the AD converter 100 is −1∼−4V. As absolute values of the voltages are obtained during the quantization (when the AD converter 110 collects voltages), the processing module 104 may set the desired difference between the amplified first voltage and the amplified second voltage as 3V, i.e. the predetermined threshold is 3V, and the difference between the first voltage and the second voltage is amplified 10 times. It can be seen from the above formula that, the processing module 104 may adjust one or two of the excitation voltage Vt and the predetermined factor n. If the excitation voltage Vt is amplified 10 times, the excitation voltage reaches 50V, which is too high for humans to touch directly. Moreover, it is difficult to generate so high voltage. Therefore, the excitation voltage Vt is generally not too high. Assuming that the processing module 104 adjusts the excitation voltage Vt to 10V, which is 2 times greater than the original excitation voltage, the predetermined factor n is amplified times accordingly. Then, the desired value of the amplified first voltage Va1 is −4V (the upper limit of the input range of the AD converter 110). Since the excitation voltage Vt and the predetermined factor n are determined, the regulation voltage is may be calculated according to the above formula. In the above example, at the beginning, the excitation voltage Vt=5V, the regulation voltage Vs=0V, the predetermined factor n=1, the amplified first voltage Va1=−2V, i.e., 1*(0−5*Cx/Ci)=−2, and thus Cx/Ci=0.4. Then, the processing module 104 adjusts the excitation voltage Vt to 10V and adjusts the amplification favor n to 5, and calculates the regulation voltage to be 3.2 V based on the amplified first voltage Va1=−4V and the formula 5* (Vs−10*Cx/Ci)=−4. In other words, when the excitation voltage Vt=10V. The predetermined factor n=5, and the regulation voltage Vs=3.2V, the amplified first voltage Va1=−4V and according to the above predetermined threshold, the amplified second voltage Va2=−1V, and the difference is −3V, the absolute value of which equals to the predetermined threshold. In this case, the difference is amplified as great as possible, and the amplified first voltage and the amplified second voltage do not go beyond the measurement range of the AD converter 110. In other words, after adjusting the excitation voltage, the predetermined factor and the regulation voltage, the processing module 104 configures the fingerprint detection circuit with the adjusted three parameters, and the fingerprint detection circuit 100 uses the adjusted three parameters to detect fingerprint again, i.e. the fingerprint collecting module 102 re-outputs the adjusted first voltage or the adjusted second voltage according to the adjusted excitation voltage and the adjusted regulation voltage, and the sampling hold circuit 108 re-outputs the amplified first voltage or the amplified second voltage again according to the adjusted predetermined factor.

With the fingerprint detection circuit 100 according to embodiments of the present disclosure, if the difference between the amplified first voltage and the amplified second voltage is less than the predetermined threshold, the processing module 104 adjusts the difference by adjusting at least one of the excitation voltage, the predetermined factor and the regulation voltage so as to obtain the desired difference. In this way, the difference between the amplified first voltage and the amplified second voltage collected by the processing module 104 is relatively large, and the signal to noise ratio is higher, which is more easily for subsequent algorithms to recognize, thus improving the effect of the fingerprint detection.

Figure 3:
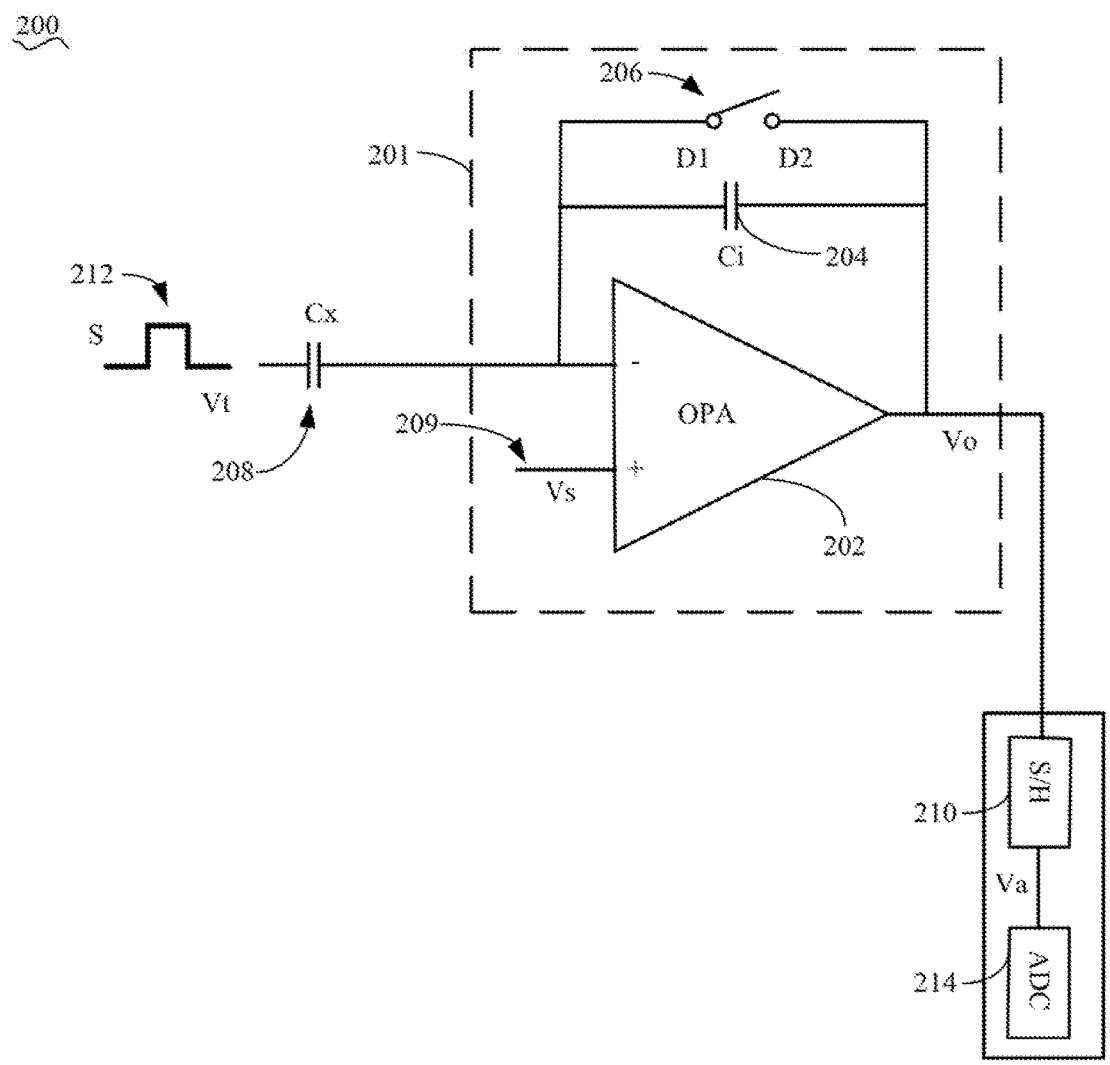
FIG. 3 is a schematic diagram of a fingerprint detection circuit according to another exemplary embodiment of the present disclosure.

FIG. 3 is a schematic diagram of a fingerprint detection circuit according to another exemplary embodiment of the present disclosure. As shown in FIG. 3, the collecting unit 201 includes a signal amplifier 202, a capacitor 204, a switch unit 206 and a second power supply (not shown), and the voltage of the second power supply is used as the regulation voltage.

When collecting fingerprints (see FIG. 2), the fingerprint detection circuit 200 may apply an excitation signal to a finger 500 by the fingerprint sensor 502 so as to generate finger capacitors (ridge capacitors and valley capacitors) 218.

The negative input terminal of the signal amplifier 202 is connected with one of the finger capacitors 208, and the positive input terminal of the signal amplifier 202 is connected with the reference voltage terminal 209. The signal processor 202 outputs the output voltage from the output terminal of the signal amplifier 202 according to the regulation voltage and the capacitance voltage of one of the finger capacitors 208, and transmits the output voltage to the sampling hold circuit 210.

In an embodiment, the reference voltage terminal 209 is the output terminal of the second power supply, that is, the positive terminal of the signal amplifier 202 is connected with the second power supply.

In an embodiment, the capacitor 204 may be an inner capacitor of the fingerprint sensor or other capacitors, and the capacitance value of the capacitor 204 is generally fixed.

The switch unit 206 is connected with the negative input terminal of the signal amplifier 202 and the output terminal of the signal amplifier 202 respectively, and configured to control the capacitor 204 to be connected between the negative input terminal of the signal amplifier 202 and the output terminal of the signal amplifier 202, such that the first voltage has a non-linear relationship with the capacitance value of one of the ridge capacitors, and the second voltage has a non-linear relationship with the capacitance value of one of the valley capacitors.

In an embodiment, the switch unit 206 is connected with the capacitor 204 in parallel. The switch unit 206 includes a first connecting terminal D1 and a second connecting terminal D2.

The first connecting terminal D1 is connected with the first terminal of the capacitor 204 and the negative input terminal of the signal amplifier 202 respectively. The second connecting terminal D2 is connected with the second terminal of the capacitor 204 and the output terminal of the signal amplifier 202 respectively.

When the switch unit 206 is turned off, the capacitor 204 is communicated with the negative input terminal of the signal amplifier 202 and the output terminal of the signal amplifier 202 respectively. That is, when the switch unit 206 is turned off, the capacitor 204 is in communication with the negative input terminal of the signal amplifier 202 and the output terminal of the signal amplifier 202 respectively. The communication means connection and electric conduction.

When the switch unit 206 is turned on, the capacitor 204 is disconnected between the negative input terminal of the signal amplifier 202 and the output terminal of the signal amplifier 202. In this embodiment, when the switch unit 206 is turned on, although the capacitor 204 is connected between the negative input terminal of the signal amplifier 202 and the output terminal of the signal amplifier 202, the capacitor 204 is short-circuited by the switch unit: 206, and the capacitor 204 cannot be communicated with the negative input terminal of the signal amplifier 202 and the output terminal of the signal amplifier 202 respectively.

Thus, the output voltage from the output terminal of the signal amplifier 202 is equal to the voltage of the second power supply. The capacitor 204 is short-circuited and disconnected between the negative input terminal of the signal amplifier 202 and the output terminal of the signal amplifier 202, and thus has no effect on the output voltage from the output terminal of the signal amplifier 202.

In an embodiment, as shown in FIG. 3, the fingerprint detection circuit 200 further includes a sampling hold circuit 210 and an AD convener 214. The sampling hold circuit 210 is connected between the output terminal of the signal amplifier 202 and a terminal of the AD converter 214. The sampling hold circuit 210 is configured to amplify the output voltage from the output terminal of the signal amplifier 202 by a predetermined factor. The AD converter 214 is configured to convert an amplified output voltage to a numerical value and save the numerical value. The fingerprint detection circuit 200 may further include a digital signal processor (not shown) for processing digital signals, and the digital signal processor is connected with the output terminal of the AL) converter 214. The digitized voltages from the signal amplifier 202 are convenient for following computation.

In an embodiment, the capacitance value of one of the finger capacitors 208 is determined according to a formula of Vo=(Vs−Vt*Cx/Ci), where, Vo the output voltage from the output terminal of the signal amplifier 202, Vt is the voltage magnitude of the excitation signal (the excitation voltage), Cx is the capacitance value of one of the finger capacitors 208, Ci is the capacitance value of the capacitor 204, and Vs is the voltage of the second power supply (the regulation voltage). According to the formula, the output voltage Vo from the output terminal of the signal amplifier 202 has a non-linear relationship with the capacitance value Cx of one of the finger capacitors 208.

For example, when the fingerprint detection circuit 200 is initialized, the switch unit 206 is turned on, two terminals of the finger capacitor 208 are connected to ground, and the signal generator 212 is connected to ground (Vt is connected to ground). At this time, the output voltage Vo from the output terminal of the signal amplifier 202 is equal to Vs, and the initialization is completed.

When the fingerprint detection circuit 200 collects fingerprints, the switch unit 206 is turned off, the signal generator 212 increases the excitation voltage Vt, and during the increasing of the excitation voltage Vt, the finger capacitor 208 is charged, in which the electric quantity of charges is Q=Vt*Cx. According to the virtual short and virtual off feature of the operational amplifier, the output voltage from the signal amplifier 202 will decrease, and the capacitor 204 is charged with the same amount of charges, thus keeping the input terminal of the operational amplifier at the voltage Vs of the second power supply. Then, the electric quantity charged to the capacitor 204 is Q=(Vs−Vo)*Ci=Vt*Cx, and thus the output voltage Vo from the signal amplifier 202 is Vo=Vs−Vt*Cx/Ci. Then, the voltage Vo is amplified n times by the sampling hold circuit 210, and the final detection voltage input to the AD converter 214 is Va=n*(Vs−Vt*Cx/Ci). Therefore, by adjusting at least one of the excitation voltage Vt, the voltage Vs of the second power supply, and the predetermined factor n, the voltage from the signal amplifier 202 may be adjusted, i.e., the amplified first voltage or the amplified second voltage may be adjusted, thus adjusting de difference between the amplified first voltage and the amplified second voltage.

The specific adjusting procedure may refer to that in the first exemplary embodiment, which is not elaborated herein.

With the above fingerprint detection circuit 200, if the difference between the amplified first voltage and the amplified second voltage is less than the predetermined threshold, the processing module adjusts the difference by adjusting at least one of the excitation voltage, the predetermined threshold and the regulation voltage, so as to obtain the desired difference. In this way, the difference between the amplified first voltage and the amplified second voltage collected by the processing module is relatively large, and the signal to noise ratio is higher, which is easier for subsequent: algorithms to recognize, thus improving the effect of fingerprint detection.

Figure 4:
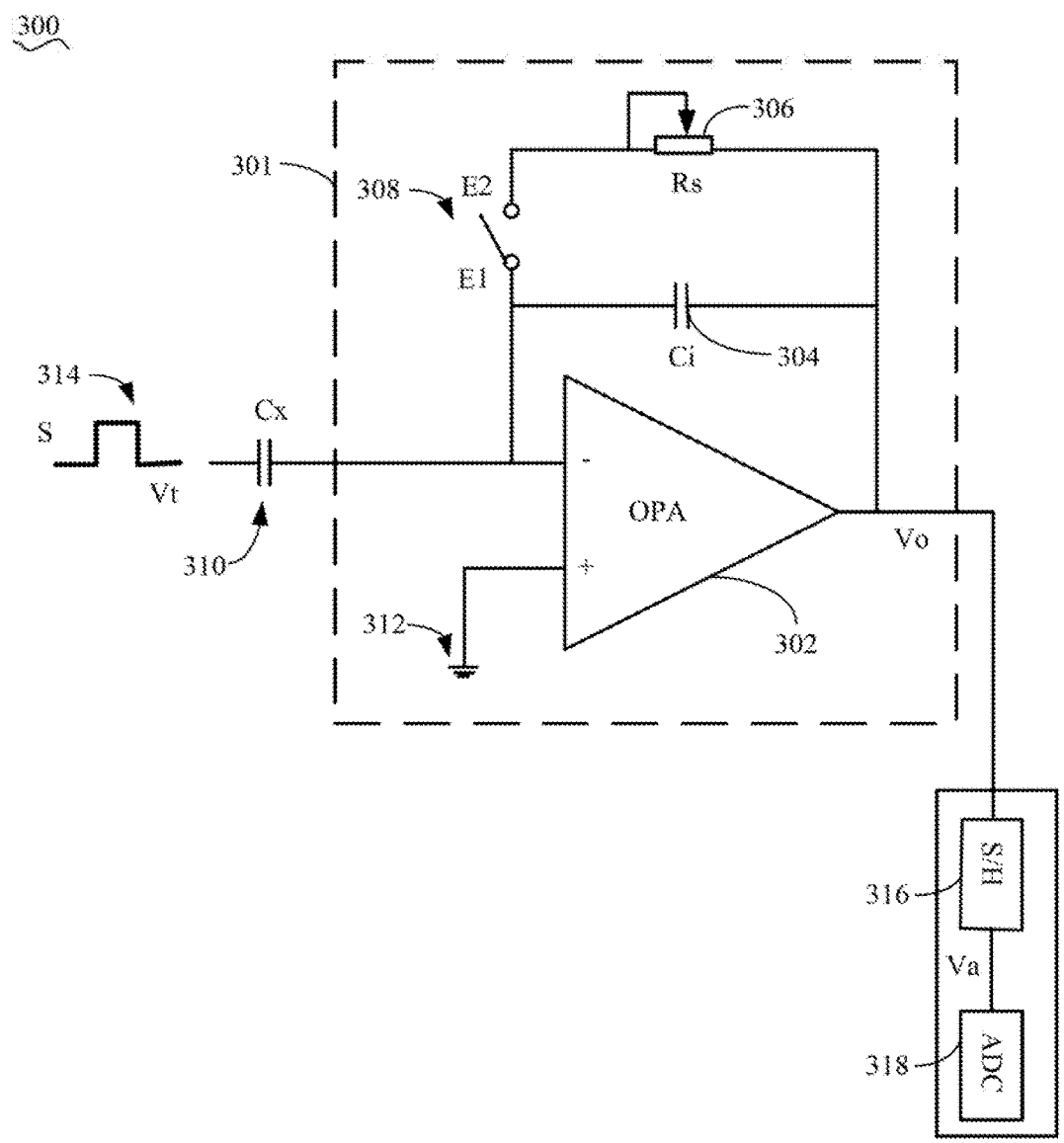
FIG. 4 is a schematic diagram of a fingerprint detection circuit according to yet another exemplary embodiment of the present disclosure.

FIG. 4 is a schematic diagram showing a fingerprint detection circuit according to yet another embodiment of the present disclosure. As shown in FIG. 4, the fingerprint detection circuit 300 includes a signal amplifier 302, a capacitor 304, a rheostat 306 and a switch unit 308.

When collecting fingerprints (see FIG. 2), the fingerprint detection circuit 100 may apply an excitation signal to a finger 500 so as to generate finger capacitors ridge capacitors and valley capacitors) 310.

The negative input terminal of the signal amplifier 302 is connected with the finger capacitor 310, and the positive input terminal of the signal amplifier 302 is connected to a reference voltage terminal 312. The signal amplifier 302 outputs the first voltage or the second voltage from the output terminal of the signal amplifier 302 according to the capacitance value of one of the finger capacitors 310 and the regulation voltage.

In an embodiment, the reference voltage terminal 312 is a ground terminal, that is, the positive terminal of the signal amplifier 302 is connected to the ground terminal.

In an embodiment, the capacitor 304 may be an inner capacitor of the fingerprint sensor or other capacitors, and the capacitance value of the capacitor 304 is generally fixed. The capacitor 304 is connected between the negative input terminal of the signal amplifier 302 and the output terminal of the signal amplifier 302.

The switch unit 308 is connected with the rheostat 306 in serial and configured to control the rheostat. 306 to be connected with the capacitor 304 in parallel.

In an embodiment, the switch unit 308 includes a first connecting terminal E1 and a second connecting terminal. E2 When the switch unit 308 is turned on, i.e. The first connecting terminal E1 connected with the second collecting terminal E2, the rheostat 306 is connected with the capacitor 304 in parallel, such that the first voltage has a non-linear relationship with the capacitance value of one of the ridge capacitors, and the second voltage has a non-linear relationship with the capacitance value of one of the valley capacitors.

When the switch unit 308 is turned off, i.e., the first connecting terminal E1 is disconnected from the second connecting terminal E2, the rheostat 306 is not connected in the discharging s loop of the capacitor 304. The switch unit 308 may be turned off when the fingerprint detection circuit 300 collects fingerprint data based on a wide range of parameters.

In an embodiment, as shown in FIG. 4, the fingerprint detection circuit. 300 further includes a sampling hold circuit 316 and an AD converter 318. The sampling hold circuit 316 is connected between the output terminal of the signal amplifier 302 and a terminal of the AD converter 318. The sampling hold circuit 316 is configured to amplify the output voltage from the output terminal of the signal amplifier 302 by a predetermined factor. The AD converter 318 is configured to convert an amplified output voltage to a numerical value and save the numerical value. The fingerprint detection circuit 300 may further include a digital signal processor (not showing) for processing digital signals, and the digital signal processor is connected with the output terminal of the AD converter 318. The digitized voltages from the signal amplifier 302 are convenient for following computation.

For example, when the fingerprint detection circuit 300 is initialized, the processing module controls the switch unit 308 to turn on, the capacitor 304 is not charged, the finger capacitor 310 is connected to ground, and a signal generator 314 is connected to ground (the excitation voltage Vt is connected to ground). At this time, the output voltage Vo from the signal amplifier 302 is equal to 0.

When the fingerprint detection circuit 300 collects fingerprints, the signal generator 314 increases the excitation voltage Vt, and during the increasing of the excitation voltage Vt, the finger capacitor 310 is charged, in which the electric quantity of charges is Q=Vt*Cx. According to the virtual short and virtual off feature of the operational amplifier, the output voltage Vo from the signal amplifier 302 will decrease, and the capacitor 304 is charged with the same amount of charges, thus remaining the input terminal of the operational amplifier at the ground level. Then, the electric quantity charged to the capacitor 304 is Q=(0−Vo)*Ci=Vt*Cx, and thus Vo=−Vt*Cx/Ci. At this time, the voltage over the capacitor 304 is −Vo, i.e., the voltage at the left terminal of the capacitor 304 is 0, and the voltage at the right terminal of the capacitor 304 is −VO, the rheostat 306 connected with the capacitor 304 in parallel discharges, and the point current I=−Vo/Rs ("−" represents a current direction, i.e. from left to right). After a short period of time Ts (with the discharging of the rheostat 306, the absolute value of the output voltage Vo decreases, and the current decreases. The current does not decrease a lot if the period of time is very short, and thus the current is approximated as 1 during the period of time Ts), the discharged electric quantity is Qs=1*Ts. Since the discharged charges all come from the capacitor 304, the voltage over the capacitor 304 decreases, and the decrement is Vs=Qs/Ci. Thus, the final output voltage from the signal amplifier 302 is Vo=−Vt*Cx/Ci−(−Vs)=Vs−Vt*Cx/Ci. The output voltage Vo is amplified n times by the sampling hold circuit 346, and thus the final detection voltage input to the AD converter 318 is Va=n*(Vs−Vt*Cx/Ci), in which Vs=Qs/Ci=I*Ts/Ci=Vo/Rs*Ts/Ci=Vt*Cx*Ts/(Ci*Ci*Rs), where the detecting period Ts is a fixed value, and can be preset in the fingerprint detection circuit 300, such as Ts=2.5 microsecond. Moreover, the detecting period Ts is less than the period of the excitation signal. Therefore, the processing module may control the decrement of the voltage over the capacitor (the regulation voltage) by adjusting the resistance value of the rheostat 306, thus controlling the output. voltage Vo from the signal amplifier 302.

The specific adjusting procedure may refer to that in the first exemplary embodiment, which is not elaborated herein.

With the above fingerprint detection circuit 300, if the difference between the amplified first voltage and the amplified second voltage is less than the predetermined threshold, the processing module adjusts the difference by adjusting at least one of the excitation voltage, the predetermined threshold and the regulation voltage, so as to obtain the desired difference, in this way, the difference between the amplified first voltage and the amplified second voltage collected by the processing module is relatively large, and the signal to noise ratio is higher, which is easier for subsequent algorithms to recognize, thus improving the effect of fingerprint detection.

Figure 5:
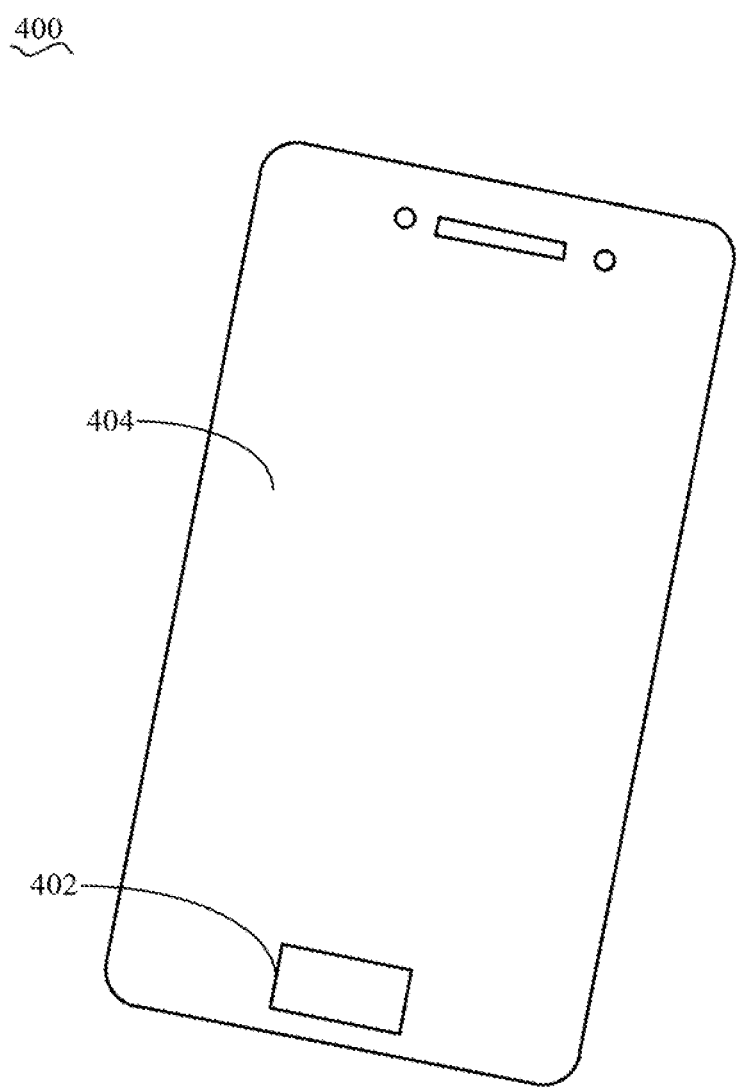
FIG. 5 is a schematic diagram of an electronic device according to an exemplary embodiment of the present disclosure.

FIG. 5 is a schematic diagram of an electronic device according to an exemplary embodiment of the present disclosure. As shown in FIG. 5, the electronic device 400 includes a fingerprint detection circuit. The fingerprint detection circuit may be configured inside the electronic device 400. The fingerprint detection circuit may be any one of the above fingerprint detection circuits in the above embodiments.

With the electronic device according to embodiments of the present disclosure, if the difference between the amplified first voltage and the amplified second voltage is less than the predetermined threshold, the processing module adjusts the difference by adjusting at least one of the excitation voltage, the predetermined threshold and the regulation voltage, so as to obtain the desired difference. In this way, the difference between the amplified first voltage and the amplified second voltage collected b the processing module is relatively large, and the signal to noise ratio is higher, which is easier for subsequent algorithms to recognize, thus improving the effect of fingerprint detection.

In an embodiment, the electronic device 400 may be a mobile phone. It can be understood that, in other embodiments, the electronic device 400 may also be a tablet PC, a notebook computer, an intelligent wearable device, an audio player, a video player, or any other electronic device having a fingerprint detection requirement.

A collecting window 402 may be configured at a front panel 404 of the electronic device 400, thus making it easy for collecting users' fingerprints. Obviously, the collecting window 402 may be configured at other locations on the electronic device 400, such as at a side or at a back panel.

Thus, the electronic deice 400 may have an improved fingerprint detection effect.

Figure 6:
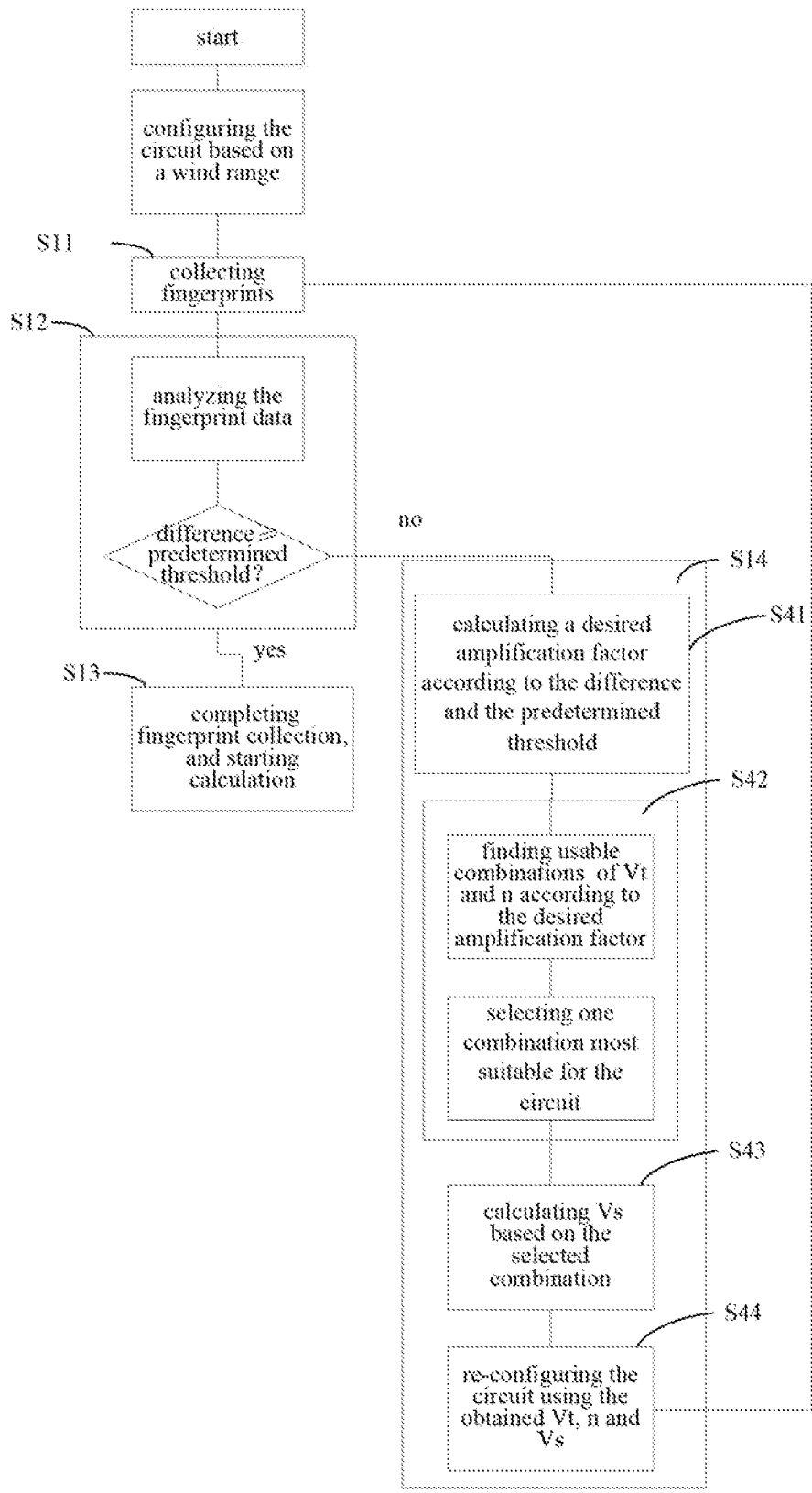
FIG. 6 is a flow chart of a fingerprint detection method according to an exemplary embodiment of the present disclosure.

FIG. 6 is a flow chart of a fingerprint detection method according to an exemplary embodiment of the present disclosure. As shown in FIG. 6, the fingerprint detection method includes following steps.

In step S11, the fingerprint data is collected.

Specifically, an excitation signal is applied to a finger, so as to generate ridge capacitors and valley capacitors. Then, the collecting unit generates a first voltage or a second voltage according to a regulation voltage, a capacitance value of one of the ridge capacitors and a capacitance value of one of the valley capacitors.

In step S12, the fingerprint data is analyzed, and it is determined whether an obtained difference is greater than or equal to a predetermined threshold, Specifically, the processing module amplifies the first voltage and the second voltage with a predetermined factor, calculates a difference between an amplified first voltage and an amplified second voltage, and determines whether the difference is greater than or equal to the predetermined threshold. If the difference is greater than or equal to the predetermined threshold, step S13 is executed, otherwise, step S14 is executed.

In step S13, the fingerprint collecting is completed, and the calculation process is started.

Specifically, the processing module calculates the capacitance value of one of the ridge capacitors according to the first voltage and calculates the capacitance value of one of the valley capacitors according to the second voltage.

In step S14, at least one of an excitation voltage, the predetermined factor and the regulation voltage is adjusted according to the predetermined threshold and the difference, and the fingerprint detection circuit is re-configured using at least one adjusted parameter.

Specifically, the processing module first calculates a desired amplification factor according to the difference and the predetermined threshold (step S41), finds usable combinations of the excitation voltage Vt and the predetermined factor n according to the desired amplification factor, and selects one combination most suitable for the fingerprint detection circuit from these combinations (step S42). Then, the processing module adjusts the regulation voltage Vs according to the selected combination (step S43) and re-configures the obtained regulation voltage Vs, excitation voltage Vt and predetermined factor n into the fingerprint detection circuit (step S44).

It can be understood that, the above fingerprint detection method may be realized by the above fingerprint detection circuit.

Before collecting fingerprint, the processing module configures the fingerprint detection circuit with a wide range of parameters. The wide range of parameters is used to ensure that the fingerprint data collected by the fingerprint detection circuit may adapt to more fingerprint characteristics. For example, the wide range is a large detection range, which generally refers to a range with a small predetermined factor and a moderate voltage. In this way, it can ensure that most fingerprint data are within the detection range of the AD converter and data overflow will not occur.

After the configuration, fingerprint collection is started, and then the processing module determines whether the difference between the amplified first voltage and the amplified second voltage is greater than or equal to the predetermined threshold and, if yes, the processing module calculates the capacitance value of one of the valley capacitors according to the second voltage and calculates the capacitance value of one of the ridge capacitors according to the first voltage. If no, the processing module calculates the desired amplification factor according to the predetermined threshold and the difference. For example, if the difference is −0.5V and the predetermined threshold is −3V, then the desired predetermined factor is 6.

Then, the processing module adjusts the excitation voltage and the predetermined factor according to the desired amplification factor so as to obtain an adjusted excitation voltage and an adjusted predetermined factor. The amplification factor is determined by the excitation voltage Vt*the predetermined factor n. Therefore, each amplification factor corresponds to a sequence of excitation voltages and predetermined factors. For example, if the amplification factor is 10, the processing module may not amplify the excitation voltage but amplify the predetermined factor 10 times; or the processing module may amplify the excitation voltage 2 times and amplify the predetermined factor 5 times; or the processing module may amplify the excitation voltage 4 times and amplify the predetermined factor 2.5 times.

However, in the fingerprint detection circuit, values of the excitation voltage and the predetermined factor are generally limited and cannot be set arbitrarily. Then an array corresponding to the desired amplification factor may be formed by these combinations of limited excitation voltages and limited predetermined factors, and then one combination realizing the best effect may be chosen from these conditions, i.e. The value of the excitation voltage and the value of the predetermined factor are determined. For example, if it is desired to amplify the difference 10 times, the processing module may choose the predetermined factor n as 2, 3, 4, 5, 6, 7 or 8, and choose the excitation voltage Vt. as 3V, 4V, 5V, 6V, 7V, 8V, 9V or 10V, which are 0.6 times, 0.8 tunes, 1 times, 1.2 times, 1.4 times, 1.8 times and 2 times respectively as compared with the original excitation voltage 5V. Then, if it is desired to amplify the difference 10 times, the combinations which may amplify the difference about 10 times include (n=5, Vt=10V, amplifying 10 times), (n=6, V=8V, amplifying 9.6 times), (n=7, Vt=7V amplifying 9.8 times), (n=8, Vt=6V, amplifying 9.6 times), (n=9, Vt=6V, amplifying 10.8 times), and (n=10, Vt=5V, amplifying 10 times). Among these combinations, the greater Vt is, the larger the signal to noise ratio is, and the larger the power consumption is. Therefore, the processing module may choose the combination with a relatively high signal to noise ratio according to the user's demand on power consumption.

After determining the value of the adjusted excitation voltage and the value of the adjusted predetermined factor, the processing module may obtain the value of the regulation voltage Vs according to the adjusted excitation voltage and the adjusted predetermined factor.

Next, the processing module configures the fingerprint detection circuit using these adjusted excitation voltage, adjusted predetermined factor and adjusted regulation voltage. Then, the fingerprint detection circuit collects the fingerprints again to obtain new fingerprint data, and then determines whether the difference between the amplified first voltage and the amplified second voltage fits the condition according to this data and, if yes, the fingerprint collection is completed. If no, the fingerprint detection and analysis are repeated until the difference fits the condition. Thus, the fingerprint detection circuit realizes the self-adaption to fingers. If the finger is wet or the finger has a shallow valley, the processing module will configure the fingerprint detection circuit again, such that the fingerprint detection circuit collects fingerprints again, so as to obtain a higher contrast, a higher signal to noise ratio and a larger difference. In this way, the subsequent algorithms may have a higher accuracy, the user may have a better experience, and the effect of fingerprint detection may be improved.

With the fingerprint detection method according to embodiments of the present disclosure, if the difference between the amplified first voltage and the amplified second voltage is less than the predetermined threshold, the processing module adjusts the difference by adjusting at least e of the excitation voltage, the predetermined threshold and the regulation voltage, so as to obtain the desired difference. In this way, the difference between the amplified first voltage and the amplified second voltage collected by the processing module is relatively large, and the signal to noise ratio is higher, which is easier for subsequent algorithms to recognize, thus improving the effect of fingerprint detection.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing, a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

What is claimed is:

1. A fingerprint detection circuit, configured to apply an excitation signal to a finger so as to generate ridge capacitors and valley capacitors, and comprising:
   a fingerprint collecting module comprising a plurality of collecting units, wherein each of the plurality of collecting units has a regulation voltage, and is configured to output a first voltage or a second voltage according to a capacitance value of one of the ridge capacitors, a capacitance value of one of the ridge capacitors, and the regulation voltage; and
   a processing module connected with the fingerprint collecting module, and configured to amplify the first voltage and the second voltage by a predetermined factor, to calculate a difference between an amplified first voltage and an amplified second voltage, and to determine whether the difference is greater than or equal to a predetermined threshold;
   wherein:
   when the difference is greater than or equal to the predetermined threshold, the processing module is further configured to calculate the capacitance value of one of the ridge capacitors according to the first voltage, and to calculate the capacitance value of one of the valley capacitors according to the second voltage; and
   when the difference is less than the predetermined threshold, the processing module is further configured to adjust an excitation voltage of the excitation signal according to the predetermined threshold and the difference, wherein the excitation voltage is a voltage magnitude of the excitation signal.

2. The fingerprint detection circuit according to claim 1, wherein
   when the excitation voltage is adjusted, the collecting unit is further configured to output a first adjusted voltage or a second adjusted voltage according to the capacitance value of one of the valley capacitors and the capacitance value of one of the ridge capacitors, and the processing module is further configured to amplify the first adjusted voltage and the second adjusted voltage by the predetermined factor, to calculate the adjusted difference between the amplified value of the first adjusted voltage and the amplified value of the second adjusted voltage, and to determine whether the adjusted difference is greater than or equal to the predetermined threshold.

3. The fingerprint detection circuit according to claim 1, wherein the first voltage has a non-linear relationship with the capacitance value of one of the ridge capacitors, and the second voltage has a non-linear relationship with the capacitance value of one of the valley capacitors.

4. The fingerprint detection circuit according to claim 1, wherein each collecting unit comprises a signal amplifier, a capacitor and a switch unit;

the signal amplifier has a negative input terminal connected with one of the ridge capacitors or one of the valley capacitors, a positive input terminal connected with a voltage reference terminal, and an output terminal configured to output the first voltage or the second voltage; and the switch unit is connected with the negative input terminal and the output terminal of the signal amplifier respectively, and is configured to control the capacitor connected between the negative input terminal and the output terminal of the signal amplifier.

5. The fingerprint detection circuit according to claim 4, further comprising a first power supply connected with the capacitor via the switch unit, wherein the switch unit is configured to control the first power supply to charge the capacitor or to control the capacitor to disconnect from the first power supply; and wherein a voltage between two terminals of the capacitor is configured to be the regulation voltage.

6. The fingerprint detection circuit according to claim 4, wherein the reference voltage terminal is a ground terminal.

7. The fingerprint detection circuit according to claim 4, wherein the switch unit comprises a first switch and a second switch;

the first switch has a first selecting terminal, a first power terminal and a first connecting terminal, the first selecting terminal is connected with a first terminal of the capacitor, the first power terminal is connected with a first electrode of the first power supply, and the first connecting terminal is connected with the negative input terminal of the signal amplifier;

the second switch has a second selecting terminal, a second power terminal and a second connecting terminal, the second selecting terminal is connected with a second terminal of the capacitor, the second power terminal is connected with a second electrode of the first power supply, and the second connecting terminal is connected with the output terminal of the signal amplifier; and the first selecting terminal is configured to be connected with the first connecting terminal or the first power terminal, and the second selecting terminal is configured to be connected with the second connecting terminal or the second power terminal.

8. The fingerprint detection circuit according to claim 4, further comprising a second power supply, wherein:

the reference voltage terminal is an output terminal of the second power supply, the switch unit is connected to the capacitor in parallel, and the voltage of the second power supply is configured to be the regulation voltage;

when the switch unit is turned off, the capacitor is communicated with the negative input terminal of the signal amplifier and the output terminal of the signal amplifier respectively; and when the switch unit is turned on, the capacitor is disconnected between the negative input terminal and the output terminal of the signal amplifier.

9. The fingerprint detection circuit according to claim 7, wherein, when the first selecting terminal is connected with the first connecting terminal and disconnected from the first power terminal, and the second selecting terminal is connected with the second connecting terminal and disconnected from the second power terminal, the capacitor is connected between the negative input terminal and the output terminal of the signal amplifier, and disconnected from the first power supply.

10. The fingerprint detection circuit according to claim 7, wherein, when the first selecting terminal is connected with the first power terminal and disconnected from the first connecting terminal, and the second selecting terminal is connected with the second power terminal and disconnected from the second connecting terminal, the first power supply is configured to charge the capacitor.

11. The fingerprint detection circuit according to claim 5, wherein the capacitance value of one of the ridge capacitors or the capacitance value of one of the valley capacitors is determined according to a formula of $$Vo=(Vs-Vt*Cx/Ci),$$

wherein Vo is the first voltage or the second voltage, Vt is the excitation voltage, Cx is the capacitance value of one of the ridge capacitors or the capacitance value of one of the valley capacitors, Ci is the capacitance value of the capacitor, and Vs is the regulation voltage.

12. The fingerprint detection circuit according to claim 1, wherein:

each collecting unit comprises a signal amplifier, a capacitor, a rheostat and a switch unit;

the signal amplifier has a negative input terminal connected with one of the ridge capacitors or one of the valley capacitors, a positive input terminal connected with a voltage reference terminal, and an output terminal configured to output the first voltage or the second voltage;

the capacitor is connected between the negative input terminal of the signal amplifier and the output terminal of the signal amplifier; and the switch unit is connected with the rheostat in series and is configured to control the rheostat to be connected with the capacitor in parallel.

13. The fingerprint detection circuit according to claim 12, wherein the capacitance value of one of the ridge capacitors or the capacitance value of one of the valley capacitors is determined according to formulas of $$Vo=(Vs-Vt*Cx/Ci)$$

$$Vs=Vt*Cx*Ts/(Ci*Ci*Rs),$$

wherein Vo is the first voltage or the second voltage, Vt is the excitation voltage, Cx is the capacitance value of one of the ridge capacitors or the capacitance value of one of the valley capacitors, Ci is the capacitance value of the capacitor, Vs is the regulation voltage, Rs is a resistance value of the rheostat, and Ts is a detecting period.

14. The fingerprint detection circuit according to claim 1, wherein the processing module further comprises a sampling hold circuit and an analog-to-digital converter, and the sampling hold circuit is connected between the output terminal of the signal amplifier and the analog-to-digital converter.

15. The fingerprint detection circuit according to claim 1, wherein the excitation signal is transmitted to the finger via an emission electrode to generate the ridge capacitors and the valley capacitors.

16. An electronic device, comprising a fingerprint detection circuit configured to apply an excitation signal to a finger so as to generate ridge capacitors and valley capacitors, wherein the fingerprint detection circuit further comprises:

a fingerprint collecting module comprising a plurality of collecting units, wherein each of the plurality of collecting units has a regulation voltage, and is configured to output a first voltage or a second voltage according to a capacitance value of one of the ridge capacitors, a capacitance value of one of the ridge capacitors, and the regulation voltage; and a processing module connected with the fingerprint collecting module, and configured to amplify the first voltage and the second voltage by a predetermined factor, to calculate a difference between an amplified first voltage and an amplified second voltage, and to determine whether the difference is greater than or equal to a predetermined threshold;

wherein:

when the difference is greater than or equal to the predetermined threshold, the processing module is further configured to calculate the capacitance value of one of the ridge capacitors according to the first voltage, and to calculate the capacitance value of one of the valley capacitors according to the second voltage; and when the difference is less than the predetermined threshold, the processing module is further configured to adjust an excitation voltage of the excitation signal according to the predetermined threshold and the difference, wherein the excitation voltage is a voltage magnitude of the excitation signal.

17. The electronic device according to claim 16, wherein:

when the excitation voltage is adjusted, the collecting unit is further configured to output a first adjusted voltage or a second adjusted voltage according to the capacitance value of one of the valley capacitors and the capacitance value of one of the ridge capacitors, and the processing module is further configured to amplify the first adjusted voltage and the second adjusted voltage by the predetermined factor, to calculate the adjusted difference between the amplified value of the first adjusted voltage and the amplified value of the second adjusted voltage, and to determine whether the adjusted difference is greater than or equal to the predetermined threshold.

18. The electronic device according to claim 16, wherein the first voltage has a non-linear relationship with the capacitance value of one of the ridge capacitors, and the second voltage has a non-linear relationship with the capacitance value of one of the valley capacitors.

19. A fingerprint detection method, comprising:

applying an excitation signal to a finger so as to generate ridge capacitors and valley capacitors;

generating a first voltage or a second voltage by a collecting unit according to a regulation voltage, a capacitance value of one of the ridge capacitors and a capacitance value of one of the valley capacitors;

amplifying the first voltage and the second voltage with a predetermined factor by a processing module;

calculating a difference between an amplified first voltage and an amplified second voltage by the processing module;

determining whether the difference is greater than or equal to a predetermined threshold by the processing module;

when the difference is greater than or equal to the predetermined threshold, calculating the capacitance value of one of the ridge capacitors according to the first voltage and calculating the capacitance value of one of the valley capacitors according to the second voltage by the processing module; and when the difference is less than the predetermined threshold, adjusting an excitation voltage of the excitation signal according to the predetermined threshold and the difference by the processing module, wherein the excitation voltage is a voltage magnitude of the excitation signal.

* * * * *